US010499271B2

(12) United States Patent
Li et al.

(10) Patent No.: US 10,499,271 B2
(45) Date of Patent: Dec. 3, 2019

(54) METHODS AND APPARATUSES FOR INTER-NETWORK MEASUREMENT IN A WIRELESS NETWORK

(71) Applicant: Telefonaktiebolaget LM Ericsson (publ), Stockholm (SE)

(72) Inventors: Gen Li, Beijing (CN); Cong Shi, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/569,672

(22) PCT Filed: Apr. 29, 2015

(86) PCT No.: PCT/CN2015/077849
§ 371 (c)(1),
(2) Date: Oct. 26, 2017

(87) PCT Pub. No.: WO2016/172888
PCT Pub. Date: Nov. 3, 2016

(65) Prior Publication Data
US 2018/0132125 A1    May 10, 2018

(51) Int. Cl.
*H04W 24/10* (2009.01)
*H04W 16/14* (2009.01)
(Continued)

(52) U.S. Cl.
CPC ........... *H04W 24/10* (2013.01); *H04W 16/14* (2013.01); *H04W 24/08* (2013.01); *H04W 24/02* (2013.01)

(58) Field of Classification Search
CPC .............................. H04W 16/14; H04W 24/10
See application file for complete search history.

(56) References Cited

U.S. PATENT DOCUMENTS 9,848,340 B2 * 12/2017 Kazmi ................ H04W 48/16
2004/0157637 A1 * 8/2004 Steer ..................... H01Q 1/246
455/525
(Continued)

FOREIGN PATENT DOCUMENTS

CN          103747450 A      4/2014
CN          103841565 A      6/2014
(Continued)

OTHER PUBLICATIONS

3GPP, "3rd Generation Partnership Project; Technical Specification Group Radio Access Network; Evolved Universal Terrestrial Radio Access (E-UTRA); Physical channels and modulation (Release 14)", 3GPP TS 36.211 V14.2.0, Mar. 2017, 1-194.
(Continued)

*Primary Examiner* — Scott M Sciacca
(74) *Attorney, Agent, or Firm* — Patent Portfolio Builders, PLLC

(57) ABSTRACT

Embodiments of the present disclosure provide a method for inter-network measurement at a terminal device in a wirelesses network. The method comprises receiving an inter-network measurement configuration message containing measurement configurations. The method further comprises performing an inter-network measurement based on the measurement configurations contained in the inter-network measurement configuration message, so as to obtain information on inter-network interference. The method further comprises reporting a measurement result of the inter-network measurement, wherein the measurement result includes the information on inter-network interference. In addition, there are also provided an apparatus for inter-network measurement at a terminal device in a wirelesses network and a method and apparatus for inter-network measurement at an access node in a wireless network. With the solution of the present disclosure, it is possible to obtain
(Continued)

information on the inter-network interference, which could provide a prerequisite of coordination schemes and enable coordinated spectrum sharing work well in system operation.

11 Claims, 7 Drawing Sheets

(51) Int. Cl.
H04W 24/08 (2009.01)
H04W 24/02 (2009.01)

(56) References Cited

U.S. PATENT DOCUMENTS

| | | |
|---|---|---|
| 2009/0213007 A1* | 8/2009 | Shan .............. H04B 7/024 342/367 |
| 2011/0182375 A1* | 7/2011 | Kim .............. H04W 72/0426 375/260 |
| 2013/0242783 A1 | 9/2013 | Horn et al. |
| 2013/0336153 A1* | 12/2013 | Liang .............. H04W 24/10 370/252 |
| 2014/0056165 A1 | 2/2014 | Siomina et al. |
| 2014/0126403 A1 | 5/2014 | Siomina |
| 2014/0241250 A1 | 8/2014 | Jung et al. |
| 2014/0295847 A1* | 10/2014 | Futaki .............. H04W 36/0055 455/436 |
| 2014/0357256 A1* | 12/2014 | Bromell .............. H04W 24/10 455/422.1 |
| 2015/0156650 A1* | 6/2015 | Li .............. H04W 72/085 455/67.11 |
| 2016/0269087 A1* | 9/2016 | Subramanian ......... H04B 7/024 |
| 2017/0006613 A1* | 1/2017 | Kakishima .......... H04B 7/0413 |

FOREIGN PATENT DOCUMENTS

| | | |
|---|---|---|
| WO | 2014/036150 A1 | 3/2014 |
| WO | 2015109439 A1 | 7/2015 |
| WO | 2015109441 A1 | 7/2015 |

OTHER PUBLICATIONS

Extended European Search Report received in corresponding Application No. 15890268.4 dated Aug. 20, 2018, 7 pages. The reference not cited therein has been previously made of record.

* cited by examiner

METHODS AND APPARATUSES FOR INTER-NETWORK MEASUREMENT IN A WIRELESS NETWORK

TECHNICAL FIELD

The non-limiting and exemplary embodiments of the present disclosure generally relate to the technical field of wireless communications, and specifically to a method and apparatus for inter-network measurement at a terminal device in a wireless network and a method and apparatus for inter-network measurement at an access node in a wireless network.

BACKGROUND

This section introduces aspects that may facilitate a better understanding of the disclosure. Accordingly, the statements of this section are to be read in this light and are not to be understood as admissions about what is in the prior art or what is not in the prior art.

Mobile broadband continues to drive a demand for a higher overall traffic capacity and a higher achievable end-user data rate in a radio access network. Several application scenarios in the future will require substantially high system capacity and end-user data rates up to 10 Gbps in local areas. Higher frequency (e.g. 60 GHz) and thus broader bandwidth (e.g. 1 GHz) will be promising for future wireless networks, especially for 5th Generation (mobile networks.

The 5G Radio Access Technology (RAT) in high frequency band is a candidate technique for the next generation communication system due to its available huge license-free bandwidth which has been allocated worldwide at frequencies reaching up to 7 GHz. The main challenge that the 5G RAT in high frequency band has to face is a poor link budget, which is a result of the increased path loss and the extended transmission bandwidth. For a fixed transmit to receive (Tx-Rx) distance, these two aspects respectively can be translated into more severe signal attenuation and higher total noise power when compared to systems operating at lower frequencies. Recent researches on 60 GHz technology found that antenna-array beam-forming is a key solution to mitigate the limited link budget problem due to its high beam-forming gain.

The 5G RAT in high frequency band has a number of advantageous properties such as high-capacity coverage islands deployment, large channel bandwidth, high gain beam-forming, and so on, which make operations under shared spectrum promising and efficient. However, one of unavoidable issues lies in that two or more networks will be operated in overlapping areas, which might result interference from another network, which can also be called as inter-network interference.

Therefore, there is a need for a solution of inter-network measurement designed for wireless networks sharing spectrum, such as for the 5G networks.

SUMMARY

Various embodiments of the present disclosure mainly aim at providing methods and apparatuses for inter-network measurement in a wireless network to facilitate interference coordination in 5G networks. Other features and advantages of embodiments of the present disclosure will also be understood from the following description of specific embodiments when read in conjunction with the accompanying drawings, which illustrate, by way of example, the principles of embodiments of the present disclosure.

In a first aspect of the present disclosure, there is provided a method for inter-network measurement at a terminal device in a wirelesses network. The method comprises: receiving an inter-network measurement configuration message containing measurement configurations; performing an inter-network measurement based on the measurement configurations contained in the inter-network measurement configuration message, so as to obtain information on inter-network interference; and reporting a measurement result of the inter-network measurement, wherein the measurement result includes the information on inter-network interference.

In one embodiment of the present disclosure, the measurement configurations may comprise information on measurement type. The information on measurement type may indicate a blind measurement mode for neighbor network discovery if an access node serving the terminal device is not aware of any neighbor network, or alternatively indicate a monitory measurement mode for specific inter-network interference condition detection if the access node is aware of at least one neighbor network.

In another embodiment of the present disclosure, the measurement configurations may comprise information on measurement trigger which indicates a timing to trigger the inter-network measurement. The method may further comprise determining whether the inter-network measurement is triggered based on the information on measurement trigger, and the inter-network measurement may be performed in response to determining that the inter-network measurement is triggered.

In a further embodiment of the present disclosure, the information on measurement trigger may comprise any one of: a terminal device-specific measurement starting point and a measurement period; information on event trigger indicating a trigger condition to trigger an inter-network measurement; and beacon timing offset of a monitored neighbor network, a measurement starting point and a measurement period which is determined based on mobility speed of the terminal device and adjusted adaptively based on receiving signal behavior.

In a yet further embodiment of the present disclosure, the measurement configurations may further comprise information on reporting rules for measurement result reporting, which comprises one or more of: a predetermined interference level threshold for the blind measurement mode; a predetermined interference level threshold for the monitory measurement mode, and wherein the measurement result is reported in response to meeting the reporting rules.

In a still further embodiment of the present disclosure, the measurement configurations may comprise information on measurement object which indicates at least one of a neighbor network and an access node to be monitored. Besides, the information on measurement type may further indicate the blind measurement mode for further neighbor network discovery if the access node is aware of at least one neighbor network.

In a still yet further embodiment of the present disclosure, the performing an inter-network measurement may comprise: in the blind measurement mode, detecting a beacon signal from a neighbor network in omni-direction or a random beam direction to discover the neighbor network.

In a yet still further embodiment of the present disclosure, the performing an inter-network measurement may comprise: in the monitory measurement mode, monitoring a beacon signal from a neighbor network to detect signal transmission in a beam direction in which the terminal device receives signals from the access node.

In a second aspect of the present disclosure, there is provided a method for inter-network measurement at an access node in a wireless network. The method comprises: transmitting an inter-network measurement configuration message containing measurement configurations to indicate a terminal device to perform an inter-network measurement; receiving a measurement result of the inter-network measurement from the terminal device, wherein the measurement result includes information on inter-network interference; and processing the received measurement result.

In an embodiment of the present disclosure, the method may further comprise: determining information on measurement type as contained in the measurement configurations based on status of the access node. The information on measurement type may indicate a blind measurement mode for neighbor network discovery if the access node is not aware of any neighbor network, or indicate a monitory measurement mode for specific inter-network interference condition detection if the access node is aware of at least one neighbor network.

In another embodiment of the present disclosure, the processing the received measurement result comprises any one of: changing, in response to the measurement result indicating a new neighbor network being discovered, at least one of information on measurement type and information on measurement object as contained in the measurement configurations; or updating beam-pair interference information in response to the measurement result indicating a specific beam-pair interference.

In a third aspect of the present disclosure, there is provided an apparatus for inter-network measurement at a terminal device in a wireless network. The apparatus comprises a message receiving module configured to receive an inter-network measurement configuration message containing measurement configurations; a measurement performing module configured to perform an inter-network measurement based on the measurement configurations contained in the inter-network measurement configuration message, so as to obtain information on inter-network interference; and a result reporting module, configured to report a measurement result of the inter-network measurement, wherein the measurement result includes the information on inter-network interference.

In a fourth aspect of the present disclosure, there is provided an apparatus for inter-network measurement at a terminal device in a wireless network. The method comprises a message receiving module configured to receive an inter-network measurement configuration message containing measurement configurations; a measurement performing module configured to perform an inter-network measurement based on the measurement configurations contained in the inter-network measurement configuration message, so as to obtain information on inter-network interference; and a result reporting module, configured to report a measurement result of the inter-network measurement, wherein the measurement result includes the information on inter-network interference.

In a fifth aspect of the present disclosure, there is provided a terminal device for inter-network measurement in a wireless network. The terminal device comprises a processor and a memory, said memory containing instructions executable by said processor whereby the terminal device is operative to perform the method according to any of embodiments of the first aspect.

In a sixth aspect of the present disclosure, there is provided a wireless network node for inter-network measurement in a wireless network. The wireless network node comprises a processor and a memory, said memory containing instructions executable by said processor whereby the terminal device is operative to perform the method according to any of embodiments of the second aspect.

In a seventh aspect of the present disclosure, there is provided a terminal device for inter-network measurement in a wireless network. The terminal device comprises processing means adapted to perform the method according to any of embodiments of the first aspect.

In an eighth aspect of the present disclosure, there is provided a wireless network node for inter-network measurement in a wireless network. The wireless network comprises processing means adapted to perform the method according to any of embodiments of the second aspect.

According to various aspects and embodiments as described above, the terminal device may perform the inter-network measurement based on inter-network measurement configuration as contained in the inter-network measurement configuration message. Thus, the access node may obtain the inter-network interference information required for interference coordination in wireless networks from the terminal device. This provides a prerequisite of coordination schemes, and thus it is possible to perform the interference coordination at the AN, so as to set scheduling constraints on a certain beam. By means of these scheduling constraints, it may mitigate the inter-network interference and enable coordinated spectrum sharing work well in system operation.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or signs are used to designate like or equivalent elements. The drawings are illustrated for facilitating better understanding of the embodiments of the disclosure and not necessarily drawn to scale, in which.

DETAILED DESCRIPTION

Figure 1:
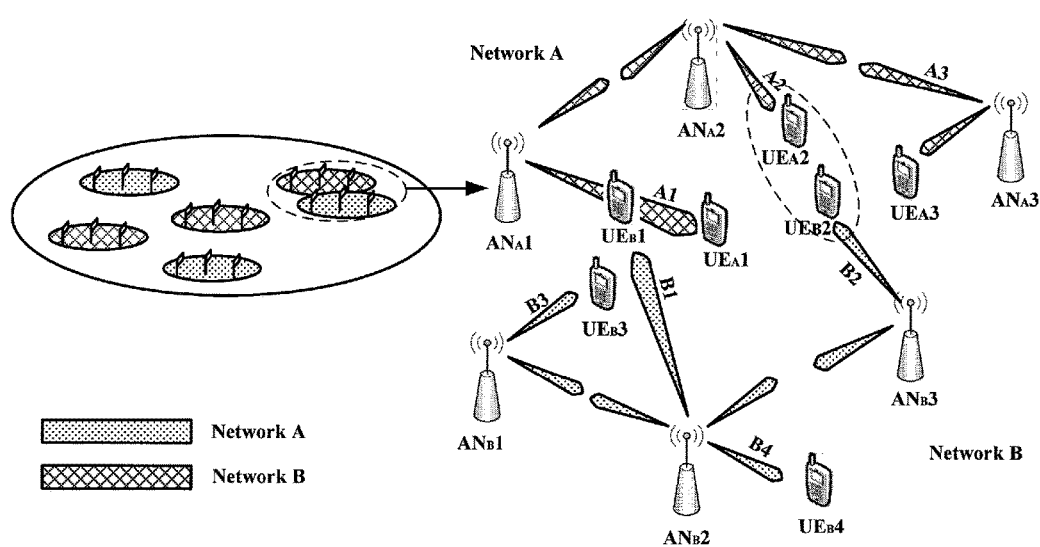
FIG. 1 schematically illustrates a system model for spectrum sharing.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

For example, the term "terminal device" used herein may refer to any terminal or UE having wireless communication capabilities, including but not limited to, mobile phones, cellular phones, smart phones, or personal digital assistants (PDAs), portable computers, image capture devices such as digital cameras, gaming devices, music storage and playback appliances and the like. In the following description, the terms "user equipment" or "UE" and "terminal device" may be used interchangeably.

As mentioned in background, two or more networks might be operated in overlapping areas, which might result in interference thereamong, which can also be called as inter-network interference. The term "inter-network interference" as used herein means interference between different wireless networks that shares the spectrum. For example, the wireless networks might be those sharing the same spectrum but belonging to different operators. Only for illustration purpose, a typical scenario of frequency sharing in wireless networks will be described with reference to FIG. 1, which illustrates a system model for spectrum sharing In FIG. 1, network A and network B are two different wireless networks sharing spectrum, for example, two 5G networks, which belong to for example two different operators. Networks A and B are deployed in the form of "high-capacity coverage islands" in areas where a high traffic demand is expected or a high connection speed is required. Although an area will normally be covered by one network, different operators might deploy their own networks in the same area. Thus, inter-network interference will predominantly occur between the partially overlapping, adjacent or neighboring areas. One of such cases is given in a dashed circle in FIG. 1, which is further enlarged at the right side of the figure in the interest of clarity.

As illustrated in FIG. 1, in the enlarged area, networks A and B are located nearby, wherein network A comprises three access nodes (ANs), $AN_A1$ to $AN_A3$ and network B comprises other three ANs, i.e., $AN_B1$ to $AN_B3$. User equipment $UE_A1$ to $UE_A3$ denote user equipment served by network A, while $UE_B1$ to $UE_B3$ denote user equipment served by network B. For example, from FIG. 1, it is clear that $UE_B2$ in network B and $UE_A2$ in network A are receiving signals in a similar beam direction; in other word, beam B2 and beam A2 are in the same beam direction. Hence, the beam B2 of the $AN_B3$ in network B will cause interference to $UE_A2$ (indicated by another dashed circle) while not to $UE_A1$ or $UE_A2$ in network A.

In such a situation, it is obviously preferable to avoid fragmentation of the available bandwidth into one exclusive sub-band per network, since large amounts of spectrum would remain unused when the networks are not simultaneously fully loaded, and peak data rates would be limited to a fraction of what could be achieved theoretically. Thus, in such a case, it seems that inter-network coordination protocol is a promising solution to alleviate such a kind of interference.

For example, for the case as illustrated in FIG. 1, if the interference from network B can be identified in network A, then some coordination between networks A and B may be performed. For example, when $UE_B2$ is scheduled in network B, network A may avoid scheduling $UE_A2$ at the same time. In such way, the interference between networks A and B can be alleviated or reduced and thus the total system performance can be improved. However, it still needs to identify the inter-network interference.

Currently, the transitional inter-cell measurement supported in Long-Term Evolution (LTE) Rel. 8 is based on cell-specific reference signal (CRS), and the inter-cell measurement supported in LTE Rel. 10 is based on channel state indication-reference signal (CSI-RS), such as Reference Signal Receiving Power (RSRP)/Reference Signal Receiving Quality (RSRQ). However, these are significantly different from the inter-network measurement as needed for interference coordination between wireless networks sharing spectrum. As is known, the inter-cell measurement is aiming to guarantee service continuity during a terminal device is moving, and thus it is triggered when the serving cell is not good. However, the inter-network measurement is to monitor interference status when two networks are overlapping deployed. Besides, the measurement in LTE is operating in low frequency, but the inter-network measurement is directed to those networks sharing spectrum, such as 5G networks, which operate in rather high frequencies, and usually and use a high gain beam-forming. Particularly, the CRS or CSI-RS based interference measurement in LTE can only identify the interference level from another cell. While in 5G networks, it is needed to differentiate a specific source of the interference, for example the specific transmission link or beam, so that the interference coordination can be performed. Based on the above-mentioned reasons, it is clear that the existing inter-cell measurement solutions in LTE can't meet needs of spectrum sharing networks such as 5G networks.

In view of the above concerns, in embodiments of the present disclosure, there is provided a solution for inter-network measurement in a wireless network, for example, 5G networks. Hereinafter, for illustrative purposes, specific embodiments of the present disclosure will be described in the context of 5G networks with reference to FIGS. 2 to 11. However, those skilled in the art shall appreciate that the concept and principle of the specific embodiments of the present disclosure may be more generally applicable to other wireless networks involving similar problems.

First, reference will be made to FIGS. 2 to 5 describe the method for inter-network measurement at a terminal device (for example, UE) in a wireless network, such as an 5G network, according to an embodiment of the present disclosure.

Figure 2:
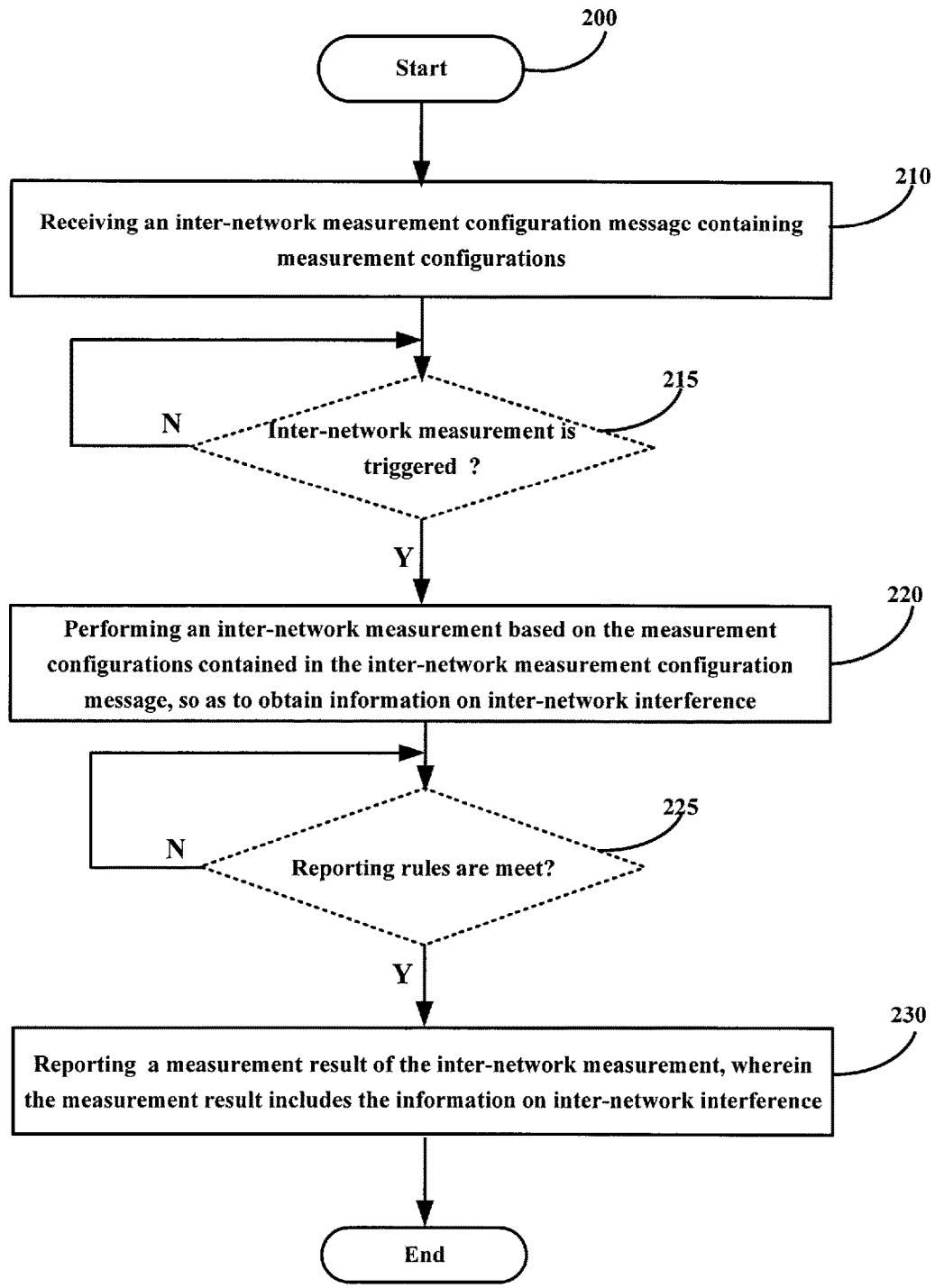
FIG. 2 illustrates a flowchart of a method for inter-network measurement at a terminal device in a wireless network according to an embodiment of the present disclosure.

As illustrated in FIG. 2, the method starts from step 210, in which an inter-network measurement configuration message is received at the terminal device from a serving node of the terminal device, for example, the access node. The inter-network configuration message comprises configuration for inter-network measurement, which at least indicates the UE to perform inter-network measurement.

The inter-network measurement configuration message may be sent from the serving AN to the UE after the link between the AN and UE is set up, or when a new neighbor network is discovered so as to update the measurement configuration. As mentioned, the measurement configuration shall comprise information indicating the UE to perform the inter-network interference. In such a way, by means of the inter-network measurement configuration message, it can inform the UE to perform the inter-network measurement to obtain information on inter-network interference.

It can be understand that different 5G networks are not always overlapping or interfering with each other when they share the same carrier, channel or spectrum. In view of this, two states can be defined for a 5G network, i.e., "Alone" and "Sharing." The "Alone" state indicates that the AN thinks that there is no neighbor network around while the "Sharing" state indicates that the AN already learns that there is at least one neighboring network sharing the same spectrum as the AN. For different states, the inter-network measurement configuration message could be different. For example, the measurement configurations may comprise different information.

In an embodiment of the present disclosure, the measurement configurations may comprise information on measurement type which indicates a mode in which the measurement is performed. It may indicate a blind measurement mode for neighbor network discovery and/or a monitory measurement mode for specific inter-network interference condition detection. The blind measurement mode is a mode in which the measurement is performed so as to discover a neighbor network. Thus, if the AN serving the UE is in the "Alone" state, i.e., is not aware of any neighbor network, the measurement configuration may comprise information on measurement type indicating blind measurement node so as to discover neighbor network. The monitory measurement mode indicates a mode in which measurement is performed to monitor specific inter-network interference condition. If the AN is in the "Sharing" state, i.e. it already knows at least one neighbor network, then the measurement can be performed in the monitory measurement mode to obtain specific inter-network interference condition between the AN and the discovered network. In such a case, the measurement configuration may comprise information on measurement type indicating the monitory measurement mode. In addition, when the AN is in the "Sharing" state, it is also possible to further perform the bind measurement so as to discover another new neighbor network. In other words, when the AN is in the "Sharing" state, the measurement configuration may comprise information on measurement type indicating both the blind measurement mode and the monitory measurement mode. In such a way, it may monitor the interference from the discovered neighbor network and at the same time discover the other new neighbor network.

In an embodiment of the present disclosure, the blind measurement mode and the monitory measurement mode can be differentiated by different measurement type identities (IDs). For example, when the measurement type ID is "0", it means the blind measurement; when the measurement type ID is "1", it denotes the monitory measurement; when the measurement type ID is other values such as "2", it denotes both the monitory measurement mode and the blind measurement mode. In such a way, the UE can explicitly know how to perform the measurement. However, it can be understood that it can work as well without indicating the measurement type; in such a case, the UE may perform the blind measurement mode and the monitory measurement mode at the same time.

In addition, the measurement configuration can further comprise information on measurement trigger so as to indicate the UE when to trigger the measurement. For example, for the blind measurement mode, the measurement configuration may further include measurement starting point and measurement period. The measurement period is a period that the measurement is performed, which can be set as a relatively large one to save UE's power, for example equal to several frame periods. The measurement starting point may indicate when to start the measurement in a measurement period, for example in which one of a plurality frames contained in the measurement period. However the large measurement period may result in a slow discovery of neighbor network. In order to alleviate this issue, two possible complementary methods can be employed. The first option is to use a UE-specific measurement staring point, i.e., different UEs may be configured with different measurement timing. In such a way, UEs in the network will perform the blind measurement at different timings.

Although for each UE, the blind measurement period does not change, from the perspective of the network, the blind measurement period for the network becomes shorter greatly because in the same time interval, there are multiple UE which perform the blind measurement for neighbor network discovery at different timings. This could result in a substantial improvement of the neighbor network discovery efficiency. The second option is to include information on event trigger in the measurement configuration, which indicates a trigger condition to trigger an inter-network measurement. For example, in the inter-network measurement configuration message, it may contain an interference level threshold for the blind measurement, such as a BER threshold, which means UE can trigger a blind measurement only when it suffers a severe interference (equal to or above the interference level threshold). In such a way, it could save the UE's power and at the same time improve the neighbor network discovery efficiency.

For the monitory measurement, more information can be included in measurement configuration. For example, the measurement configuration may comprise beacon timing offset of a monitored neighbor network, a measurement starting point and a measurement period. This measurement period can be determined based on the mobility speed of the terminal device. For the UE, the measurement period can be set to be different according to their own mobility speeds. For example, for UE at a high mobility speed whose interference might change frequently, the measurement period for the monitory measurement can be set as a shorter period; while for UE at a low mobility speed, the measurement period for the monitory measurement can be set to a longer one. Furthermore, the measurement period can also be adaptively updated based on receiving signal behavior. In an embodiment of the present disclosure, if no network is discovered in the process of blind measurement for more than certain times, the measurement period can be set to be longer. This can be done by sending a configuration update message from the AN to the UE. For the monitory measurement, if the UE's signal quality is lowered than a predetermined level, the measurement period can be shorted so that the new interference condition can be learned.

Figure 3:
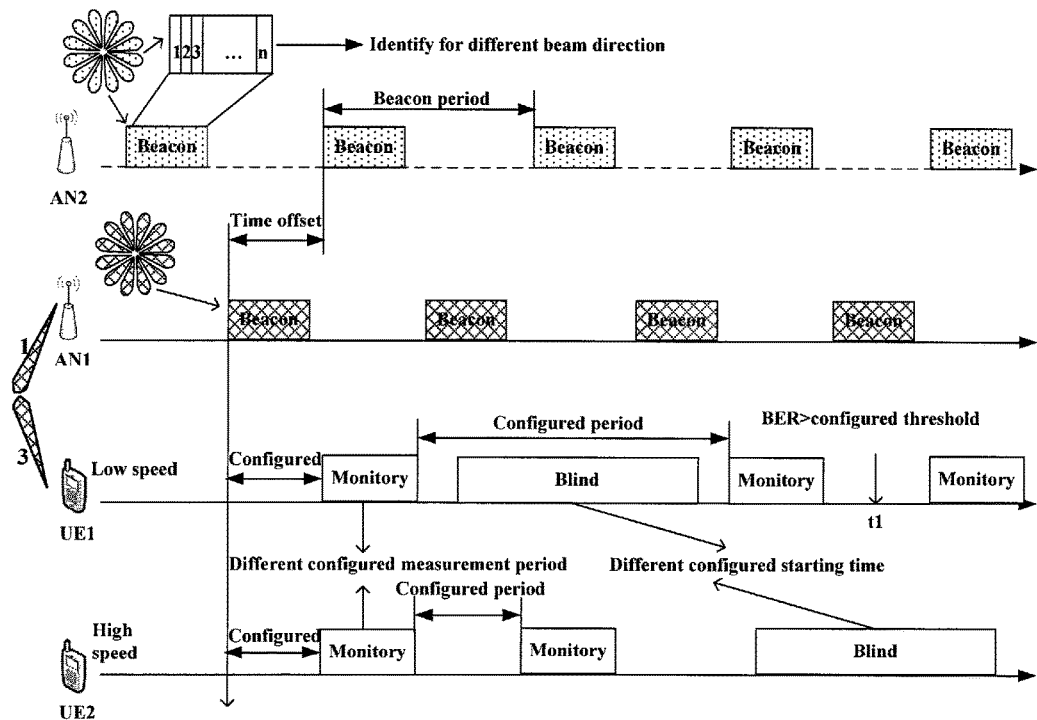
FIG. 3 schematically illustrates an example measurement trigger according to an embodiment of the present disclosure.

FIG. 3 illustrates an example monitory trigger according to an embodiment of the present disclosure. As illustrated in FIG. 3, AN 1 and AN 2 are different networks operating with Time Division Multiplexing (TDM) periodical beacon transmission. UE 1 and UE 2 are UE associated with AN 1 at a low speed and a high speed, respectively. AN 1 is in 'sharing' state and already knows there is a neighbor network node AN2 and thus AN 1 configures UE1 and UE 2 to perform both the blind measurement and the monitory measurement. For the blind measurement, the AN1 configures different starting time for UE 1 and UE 2 and thus UE 1 and UE 2 start to perform the blind measurement at different timing as illustrated in FIG. 3. If the measurement period configured for the blind measurement is T for both UE1 and UE2, the blind measurement period from network perspectives will be T/2. For the monitory measurement, according to configuration of beacon timing offset between AN1 and AN2, the UE1 and UE2 will know which time period AN2 will transmit the beacon signal. By considering the starting measurement period (different between UE1 and UE2), the AN 2's beacon's timing offset and the measurement staring point jointly, UE1 and UE2 may respectively setup up their own timers and start the monitory measurement when the timers are expired, as illustrated in FIG. 3. Besides, the measurement period for the monitory measurement may be adjusted adaptively based on receiving signal behavior. For example, the measurement period may be changed right after the UE 1 learns that the block error rate (BER) is higher than a configured BER value. Thus, the UE 1 can start the monitory measurement if its signal quality is deteriorated.

Hereinbefore, the measurement starting point is described as an indication from the AN to tell the UE when to start the blind/monitory measurement. However, the measurement starting point can also be information to indicate the UE to select the starting point at its will instead of indicating specific starting point. Or alternatively, it is also feasible to not include any measurement starting point in measurement configuration and give the right to UEs to select their own measurement starting point randomly.

In addition to the information as described hereinabove, the measurement configurations may further comprise information on reporting rules for measurement result reporting. That is to say, the measurement results will be reported only when the corresponding reporting rules are met, which could saving the transmission resource. For example, the measurement configurations may contain a predetermined interference level threshold for the blind measurement, e.g. an RSRP value. Only if the detected interference is higher than the RSRP value, the measurement result of the blind measurement will be reported as a new neighbor network discovery. The measurement configurations may also contain a predetermined interference level threshold for the monitory measurement, for example another RSRP value. Only if an RSRP power from a certain beam of a monitored node is beyond the other RSRP value, the measurement result of the monitory measurement will be reported as information on specific inter-network interference.

In another embodiment of the present disclosure, the measurement configurations may further comprise information on measurement object. This information can indicate at least one of a neighbor network and an access node to be monitored, which will facilitate the power saving of the terminal device. For example, for the blind monitory measurement, it can indicate that the UE needs to perform measurement for other networks which are different from its serving network; while, for the monitory measurement, it can indicate which neighbor network or nodes to be monitored, for example, it may include the network identification (NI), the access node identification (ANI) or physical access node identification (PANT) to indicate neighbor network or the access nodes. Besides, the information on measurement object may also be used to indicate the measurement type implicitly. As an example, if the information on measurement object indicates measurement for other networks which are different from its serving network, this implies the blind measurement mode; on the contrary, if the information on measurement object indicates neighbor specific network or the access nodes, this implies the monitory measurement mode, or both the combination of the blind measurement mode and the monitory measurement mode. In such a way, the data content contained in the configuration message can be reduced, which implies a transmission resource saving.

Referring back to FIG. 2, after the measurement configuration message is received at the terminal device, at step 220, the terminal device performs an inter-network measurement based on the measurement configurations as contained in the inter-network measurement configuration message, so as to obtain information on inter-network interference.

In a case that the measurement configurations indicate a measurement trigger, the UE may first determine at step 215 whether the inter-network measurement is triggered based on the information on measurement trigger. For example, the UE may set a timer according to the starting point and the measurement period contained in the measurement configurations and it may determine that the measurement is triggered when the time is expired. Optionally, if the information on measurement type indicate event trigger, the UE may check whether measurement event meets the trigger condition as contained within the measurement configurations, such as data transmission failed for certain number of continual packets, SINR falling below a predetermined threshold as contained in the measurement configurations, etc. If it meets the trigger condition, it may determine that the inter-network measurement is triggered.

Once the inter-network measurement is triggered, the inter-network measurement may be performed based on the measurement type as indicated in the measurement configurations. If the measurement configurations indicate the blind measurement mode, the terminal device will perform the blind measurement to discover neighbor network; if the measurement configurations indicate the monitory measurement mode, the UE will perform the monitory measurement mode to monitor the specific inter-network interference condition. For example, in the blind measurement mode, the terminal device may detect a beacon signal from a neighbor network in omni-direction or a random beam direction to discover the neighbor network, while in the monitory measurement mode, the UE will monitor a beacon signal from a neighbor network to detect signal transmission in a beam direction in which the terminal device receives signals from the access node. The beacon signal can be from all nodes in the neighbor network and from certain nodes as indicated by the information on measurement object.

The beacon signal used herein is a reference signal (RS) designed for specific interference source identification. The beacon signal comprise basic system information broadcast from an access node, such as network ID, ANI, PANI, beam information etc, which may be used to identify the network, the node and the beam. Next, for illustrative purposes, FIG. 4 shows an example frame structure according to an embodiment of the present disclosure.

Figure 4:
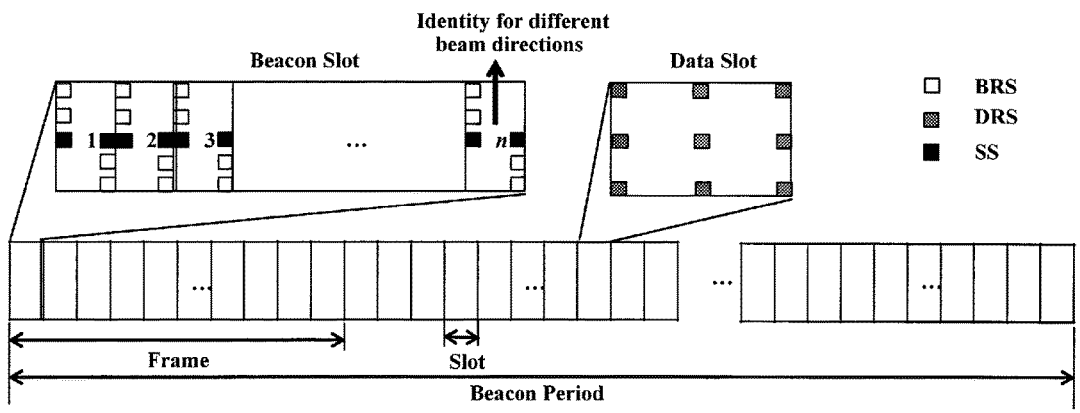
FIG. 4 schematically illustrates an example frame structure and an example reference signal structure according to an embodiment of the present disclosure.

As illustrated in FIG. 4, a beacon period is defined as a transmission period of a beacon signal, which may be for example a plurality of frame duration. A frame includes a plurality of slots, which may be used for downlink (DL) or uplink (UL) transmission. At the beginning of a beacon period, there is a beacon slot, which is broadcast by an AN to make all other nodes to learn information on synchronization, channel estimation and basic information about the AN. In the beacon slot, there are in turn n mini slots or sub-slots, which correspond to n beam directions identified with different beam IDs. Other slots in the frame are data slots for DL or UL data transmission.

In the frame structure, there might be two kinds of reference signals, i.e., beacon reference signal (BRS) and data reference signal (DRS), which are indicated by white blocks and blocks filled with dots respectively. In the same time, in each sub-slot of the beach slot, there is a synchronization signal for system synchronization. The BRS is beam specific within beacon slots while the DRS is user specific and is transmitted together with user's data transmission. By means of measuring the BRS within each beacon slot, it can achieve inter-network/inter-AN interference identification, since the beam ID of each beam direction could be implied by the BRS sequence used in the beacon slot.

In embodiments of the present disclosure, some identifies (ID) are used to identify the AN. These IDs include AN, ANI, and PANI which are already mentioned hereinbefore. For a purpose of clarification, these ID will be explained in detailed hereinbelow.

Network identity (NI): a global unique identify for a network, for example, a number of digits allocated to each operator, which may be similar to the Public Land Mobile Network (PLMN) in LTE. It can be appreciated that any other forms of IDs can also be used as long as different networks can be differentiate by the IDs;

AN identity (ANI): a local unique identity within the same network, which might be similar to eNB identity in LTE systems. The AN identity in the same network must be different but the same AN identity may be used between different networks. In a such way, the network identity in combination with the AN identity can represent a global unique identity for the AN;

Physical AN identity (PANI): the AN relates to a plurality of physical layer functions, e.g. synchronization signal, reference signal and etc. These physical layer function in the AN can be identified by different Physical identities. However, the number of physical AN identities is limited (for example 504 in LTE systems). In order to address this issue, different ANs in the same network may have the same physical AN identity but the neighbor ANs are mandatory to be configured with different physical AN identities by the same operator for example in the process of cell planning.

From the above, it can be seen that the main content in a beacon slot includes the synchronization signal, the reference signal, and the basic system information. In the existing protocol such as 3rd Generation Partnership Project (3GPP) Technical Specification (TS) 36.211, there are specified a plurality of predefined synchronization sequences. Different sequences or combination of sequences (for example, different combination of primary synchronization signal (PSS) and secondary synchronization signal (SSS) in LTE) can be used to indicate implicitly different PANIs. For the reference signal, it may assume that the used reference signal sequence is corresponding to a certain PANI. Thus, the reference signal is AN-specific and the same one sequence will be used in all beams of the same AN.

Figure 5:
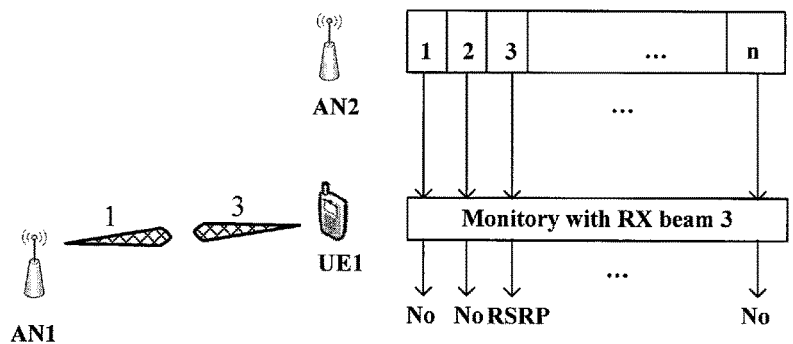
FIG. 5 schematically illustrates an example of inter-network interference measurement in a monitory measurement mode according to an embodiment of the present disclosure.

In the blind measurement mode, the UE will receive a beacon signal using omni-direction or one certain beam direction (such as RX direction of serving cell) or randomly selected direction for a whole beacon period, so as to detect if there is a beacon signal in this beacon period. The UE will use all possible sequence to make correlation for sync signal detection. If the sync signal is detected, this UE will decode system information to get beam ID, PANI, and NI of the detected AN. On the other hand, in the monitory measurement, the UE will monitor the beacon signal using its RX beam-forming direction during the beacon period, i.e. the beam direction in which it receives signals from its serving access node. Herein it is assumed the link between the UE and associated AN is well trained. This means that both the UE and the AN know each other which beam will be used to receive/transmit signal for the signal transmission therebetween. For example, as illustrated in FIG. 5, the UE 1 will use RX beam 3 to receive signals from AN 1 which uses TX beam 1. When the monitory measurement is performed, the UE 1 will use the sequence mapping from configured measured object (e.g. PANI of AN2) to detect the synchronization signal first, and then make measurement on BRS for each beam direction if the synchronization signal is detected. However, in such a case, the RSRP can only be measured successfully in certain beam direction if the beam direction 3 is also used by AN2.

By this way, it is possible obtain the information on inter-network interference, e.g., whether there is a neighbor network and whether the terminal device will suffer from interference on the certain beam. Once the information on inter-network interference is obtained, it can be reported to the AN as the measurement result at step 230. Optionally, the UE may further determine whether the reporting rules are met at step 225 and the measurement result may be reported only when the reporting rules are met. For example, for the blind measurement, it may determine whether the detected maximum RSRP value is higher than a predetermined interference threshold level. If it exceeds the predetermined interference threshold level, the UE may report network ID and node ID as the measurement result to the AN, if not, the UE does not report the measurement result. While for the monitory measurement, the UE can report RSRP value together with corresponding beam ID, node ID and network ID to its serving node if the measured RSRP is higher than the configured interference threshold for the monitory measurement.

Therefore, in the embodiments described herein above, the terminal device could obtain at the terminal device the information on inter-network interference and report it to its serving node AN, which provides a prerequisite of coordination schemes. Particular, based on the information on the inter-network inference, the AN can take corresponding actions to set scheduling constraints on a certain beam so as to avoid or at least alleviate the inter-network interference.

In the following, detailed operations at the access node will be described with reference to FIG. 6, which illustrates a flowchart of a method 600 for inter-network measurement at an access node in a wireless network according to an embodiment of the present disclosure.

Figure 6:
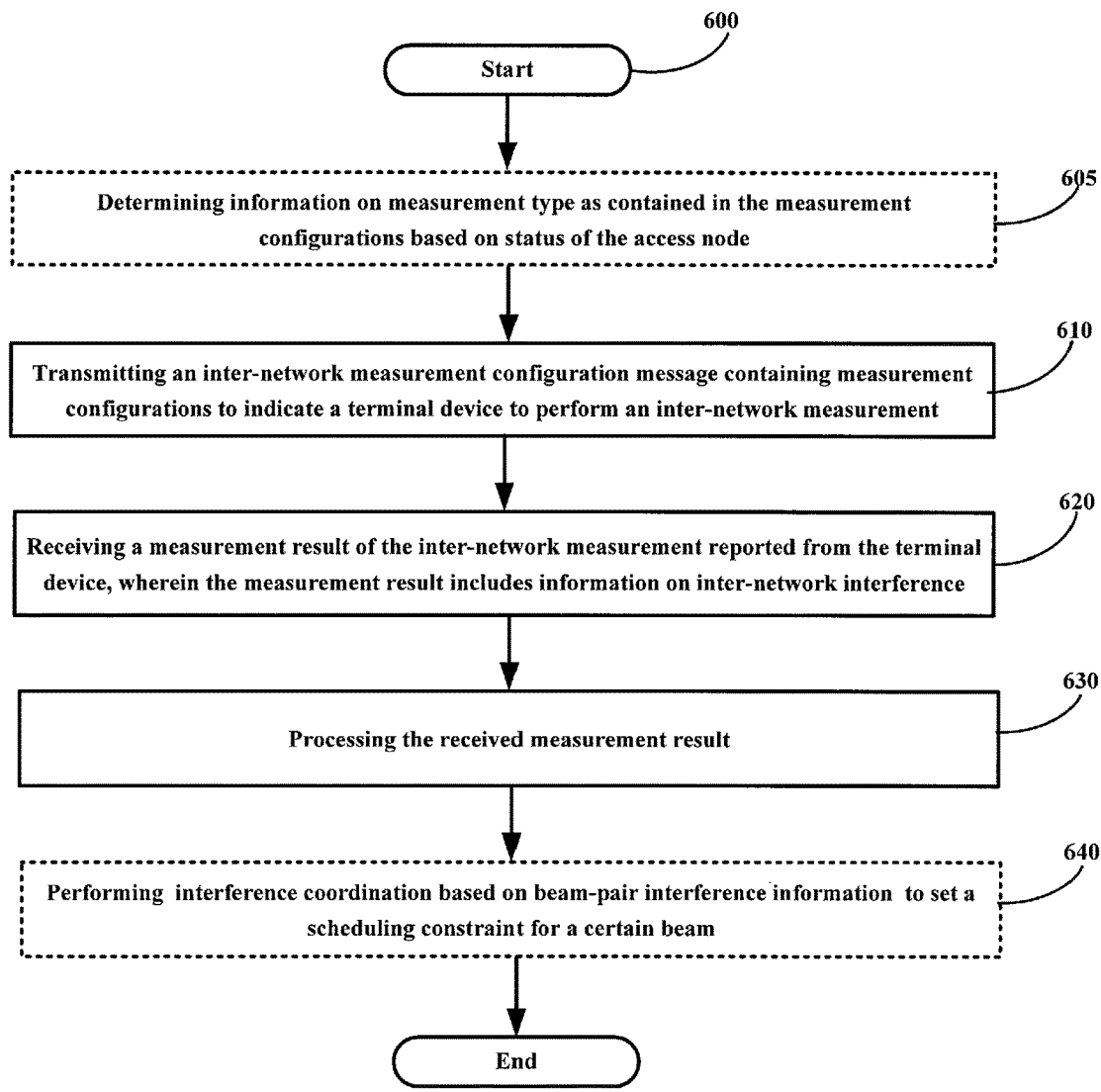
FIG. 6 illustrates a flowchart of a method for inter-network measurement at an access node in a wireless network according to an embodiment of the present disclosure.

As illustrated in FIG. 6, the AN transmits an inter-network measurement configuration message to a terminal device at step 610. As described above, the inter-network measurement configuration message contains measurement configurations to indicate a terminal device to perform an inter-network measurement.

In an embodiment of the present disclosure, before the transmitting of the inter-network measurement configuration message, it may first determine information on measurement type as contained in the measurement configurations based on status of the access node at step 605. For example, if the access node is in the "Alone" state, the AN can determine that the measurement type is the blind measurement mode; if the access node is in the "Sharing" state, the AN can determine that the measurement type is the monitory measurement mode, or alternatively the combination of the monitory measurement mode and the blind measurement mode.

In addition to the information on the measurement type, the inter-network measurement configuration message may further comprise information on measurement trigger which indicates a timing to trigger an inter-network measurement. The measurement trigger may indicate the measurement starting point, measurement period, beacon timing offset or alternatively indicates an event trigger. Additionally or alternatively, the inter-network measurement configuration message may also comprise information on reporting rules for measurement result reporting. The reporting rules can be set for the two types of measurement modes, respectively. For example, the reporting rules may indicate a predetermined interference level threshold for the blind measurement and a predetermined interference level threshold for the monitory measurement. Only if the reporting rules are met, the measurement result is reported from the terminal device.

Besides, in another embodiment of the present disclosure, the inter-network measurement configuration message may also comprise information on measurement object which indicates at least one of a network and an access node to be monitored. In such a way, only signals from relevant network nodes will be monitored, which will save power of the terminal device greatly. Details about the information that might be contained in the inter-network measurement configuration message have been described hereinabove with reference to FIGS. 2 to 5. Therefore details of the inter-network measurement configuration message can be found from corresponding contents described reference to FIGS. 2 to 5 and are omitted herein for the purpose of simplification.

Then at step 620, the AN receives the measurement result of the inter-network measurement reported from the terminal device. The measurement result includes information on inter-network interference. The measurement result for the blind measurement may include the network ID and the access node ID while the measurement result for the monitory measurement may include the network ID, the access node ID and beam ID.

At step 630, the AN may process the received measurement result. When the measurement result indicates a new neighbor network being discovered, i.e., the measurement result is from the blind measurement, the AN may change information on measurement type or change information on measurement object as contained in the measurement configurations. For example, when the AN is in in the "Alone" state and receives the measurement result of the blind measurement, the AN may change its state as "Sharing" state and change the measurement type into the monitory measurement mode, or the combination of the blind measurement mode and the monitory measurement mode. In addition, the UE may also add the measurement object to the measurement configuration. If the AN is in the "Sharing" state and receives the measurement result of the blind measurement, the AN may change the measurement object so as to indicate the terminal device to measure the interference from the new discovered network as well. On the other hand, if the measurement result indicates a specific beam-pair interference, i.e., the measurement result comes from the monitory measurement, the AN may update beam-pair interference information stored in the AN. The beam-pair interference information may be stored in a table at the AN. This table may contain information on measurement results in received reports from all terminal devices within a time window and can be updated from time to time based on the receiving reports. For a purpose of illustration, Table 1 illustrates an example of inter-network interference information table at the AN according to an embodiment of the present disclosure.

TABLE 1

Inter-network Interference Information Table at the AN

| AN1 (Victim) | AN2 (Aggressor) | | |
| --- | --- | --- | --- |
| | Beam 1 | Beam 2 | Beam 3 |
| Beam 1 | — | — | −70 dBm |
| Beam 2 | — | −55 dBm | — |
| Beam 3 | — | −68 dBm | — |

("—" indicates that the interference power does not exceed a reporting threshold or there is no report for this).

As an example, if UE1 is served by beam 1 of AN1 and reports that its receiving power at beam 3 of AN2 is −70 dBm, which means beam 3 of AN2 will result in −70 dBm interference power to beam 1 of AN1 if they are transmitted in the same resource. Based on all these kinds of information, AN1 will update beam specific interference table as the example shows in the above Table 1.

Figure 7:
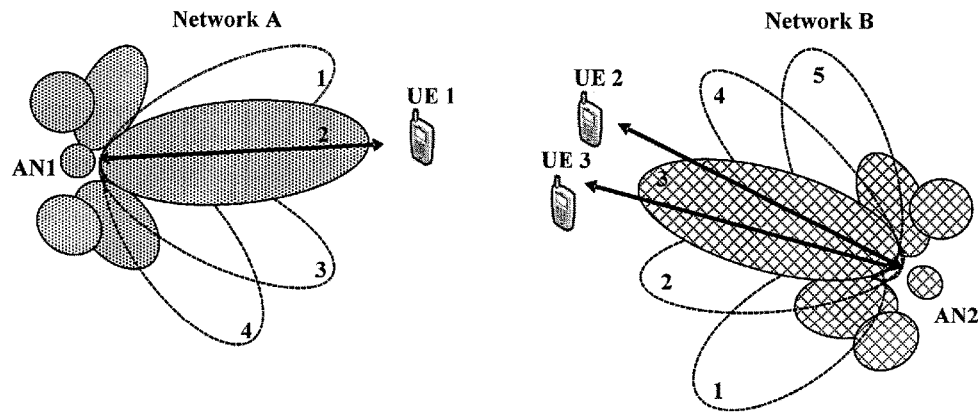
FIG. 7 schematically illustrates an example for beam-link mapping for scheduling constraints according to an embodiment of the present disclosure.

After the inter-network interference information is processed, the interference coordination may be performed by a coordination functionality comprised in the AN or any another central entity based on the beam-pair interference information to set a scheduling constraint for a certain beam. It can be appreciated that, by using the above-mentioned solution, as a victim node, each AN may obtain from a number of terminal devices associated with the AN the beam-pair interference information for its neighbor ANs (aggressor) in different networks. In such a way, it can perform interference coordination based on the information on the beam-pair interference information so as to set a scheduling constraint for a certain beam so that the inter-network interference can be mitigated or even avoided. For example, it can limit a certain beam can only be used in its half. Thus, different from the scheduling constrains on the link, the coordination functionality in embodiments of the present disclosure can be performed on a beam basis instead of a link and thus the result of coordination will be the scheduling constraint for the certain beam. Besides, a coordination functionality may send beam-specific resource scheduling constraint to its connected AN. It is clear that the inter-network interference information is obtained from the terminal device; however, the resulting scheduling constraint on the certain beam can be valid for both downlink and uplink data transmission within that beam since the uplink transmission. For illustration purposes, FIG. 7 illustrates an example for beam-link mapping for scheduling constraint according to an embodiment of the present disclosure. As illustrated in FIG. 7, UE 1 receives signal on beam 2 from AN 1 in network A while UE 2 and UE 3 receive signals on beam 3 from AN 2 in network B The beam 2 of AN 1 in network A corresponds to beam 3 of AN2 in network B, i.e. they have the same beam direction. In FIG. 7, it is identified that beam 2 at AN1 and beam 3 at AN2 are interfering with each other. Thus, according to the coordination scheme, beam 2 and beam 3 are constrained to be scheduled in the first half and last half resource respectively. When this constraint is signaled to AN1 and AN2, AN 1 will schedule AN1-UE1 transmission only at the first half resource and AN2 will schedule AN2-UE2, AN2-UE3 transmission only at the last half. For example, when AN 1 schedules the AN1-UE1 transmission, it will first check whether the beam using for the transmission has a scheduling constraint. If so, the AN1 will schedule AN1-UE1 transmission according to the scheduling constraint on the beam, for example schedules the AN1-UE1 transmission only at the first half resource.

In the above-mentioned embodiments of the present disclosure, the access node may configure the UE by means of an inter-network measurement configuration message so that the UE could perform the inter-network measurement based on inter-network measurement configuration as contained in the inter-network measurement configuration message. Thus, the UE could obtain the information on the inter-network interference through the inter-network measurement and report it to the access node This provides a prerequisite of coordination schemes, and thus it is possible to perform interference coordination based on the information on inter-network interference so as to set scheduling constraints on a certain beam. By means of these scheduling constraints, it may mitigate the inter-network interference and enable coordinated spectrum sharing work well in system operation.

For illustrative purposes, hereinafter a specific implementation for the solution as provided herein will be detailed with reference to FIG. 8, which illustrates a specific implementation of a method for inter-network measurement in a wireless network according to an embodiment of the present disclosure.

Figure 8:
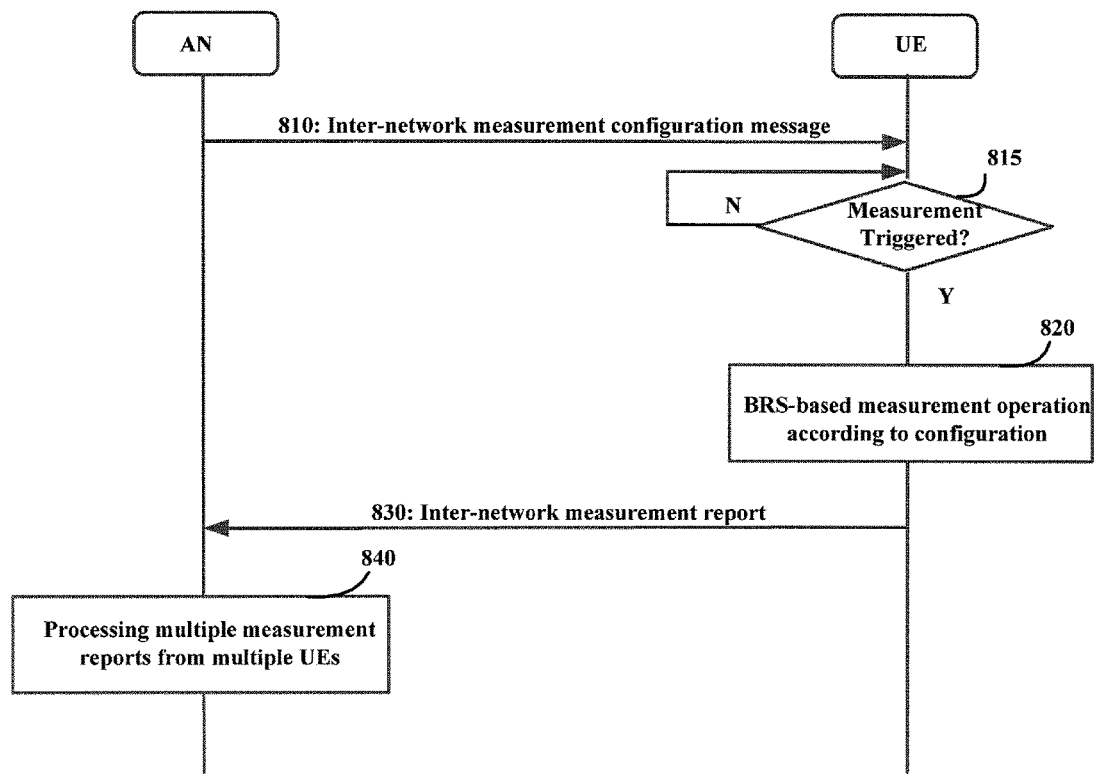
FIG. 8 illustrates a specific implementation of a method for inter-network measurement in a wireless network according to an embodiment of the present disclosure.

As illustrated in FIG. 8, at step 810, the AN may first send an inter-network measurement configuration message to the UE. For example, when the link between the AN and the UE is set up, this measurement configuration may be sent to the UE. The inter-network measurement configuration message includes the inter-network measurement configurations, which indicates the UE to perform the inter-network measurement to get the information on the inter-network. The inter-network measurement configurations may comprise for example information on measurement type, information on measurement objects, information on measurement trigger, information on reporting rule, etc.

The information on measurement type indicates a mode in which the measurement is performed. If the AN serving the UE is in the "Alone" state, the information on measurement type may indicate blind measurement node for neighbor network discovery. If the AN is in the "Sharing" state, the information on measurement type may indicate the monitory measurement mode for specific inter-network interference condition detection, or alternatively indicates the combination of the monitory measurement mode and the blind measurement mode so as to enable new neighbor network detection during the monitory measurement.

The measurement configurations may further comprise information on measurement object. This information can indicate at least one of a neighbor network and an access node to be monitored. It may indicate the UE to measure other networks which are different from the network which serves the UE, or indicates a certain network or nodes to be monitored. By means of this information, the UE may know the measurement objects and perform the inter-network measurement on specified objects, which will reduce the power of the UE and while keep the measurement efficiency. The information on measurement objects may include any kind of information which could indicate the UE to perform measurement on other networks, for example a predetermined value such as "0"; while the information on measurement objects for the monitory measurement may include the network identification (NI), the access node identification (ANI) or physical access node identification (PANI). Besides, the measurement objects can also be used to imply the measurement type although they can be indicated separately. For example, if the information on measurement objects indicates a specific network or node, it implicitly indicates the monitory measurement mode, or the combination of the monitory measurement mode and the blind measurement mode; if the information on measurement objects indicates other networks than the serving network, it implicitly indicates the blind measurement mode.

The information on measurement trigger is to indicate the UE when to trigger the measurement. For example, for the blind measurement mode, the information on measurement trigger may comprise the measurement starting point and the measurement period. The measurement period may be specific to the UE. In other words, different UEs may be configured with different measurement timing, so as to improve the neighbor network discovery efficiency. In addition, the information on event trigger may indicate a trigger condition to trigger an inter-network measurement instead of indicating the measurement starting point and the measurement period. For the monitory measurement, the measurement configuration may comprise beacon timing offset of a monitored neighbor network, a measurement starting point and a measurement period. The measurement period can be determined based on mobility speed of the terminal device.

The measurement period of the blind measurement can also be adaptively updated based on measurement result. For example, if there is no neighbor network discovered in the process of blind measurement for more than certain times, the measurement period can be set to be longer. Alternatively or additionally, the measurement period of the monitory measurement can also be adaptively updated based on receiving signal behavior. Particularly, if the UE's signal quality is lowered than a predetermined level, the measurement period for the monitory measurement can be also shorted so as to the new interference condition can be learned.

The information on reporting rules indicates rules for measurement result reporting. This means that measurement result is reported only when a corresponding rule is met. For example, only if the detected interference is higher than a RSRP value indicated in the reporting rules, the measurement result of the blind measurement will be reported as a new neighbor network discovery. On the other hand, if an RSRP power from a certain beam of a monitored node is beyond the other RSRP value, the measurement result of the monitory measurement will be reported as information on specific inter-network interference.

The information on measurement types, measurement objects and measurement triggers are sent to the UE in the inter-network measurement configuration. Upon receiving the information, the UE will determine whether the inter-network measurement shall be triggered. For example, the UE may set a timer based on the information on measurement trigger as contained in the inter-network measurement configuration message, such as the beacon timing offset of a neighbor network, the starting point, the measurement period, etc. The UE may determine that the measurement is triggered when the timer runs out. Alternatively, when the measurement indicates a trigger condition, such as data transmission failed for certain number of a continual packet or SINR falling below a predetermined value, the UE may check whether a measurement event meets the trigger condition. If the trigger condition is met, the UE may determine that the inter-network measurement is triggered.

Once the UE determines that the inter-network measurement is triggered (Y in step 815), the UE may perform the inter-network measurement at step 820. Particularly, if the information on measurement type indicates the blind measurement mode, the terminal device may detect a beacon signal from a neighbor network in omni-direction or a random beam direction to detect if there is a beacon signal in this beacon period. The UE will use all possible sequences to make correlation for sync signal detection. If a sync signal is detected, this UE will decode system information to get beam ID, PANI, and NI of the detected AN.

On the other hand, if the information on measurement type indicates the monitory measurements, the UE will monitor beacon signal in its RX beam-forming direction during the beacon period to check whether there is interference in the beam direction. If the UE detects a beacon signal from other network in its own RX beam-forming in which the UE receives signals from its serving access node, it may obtain the beam ID of its neighbor network, the receiving power of the beacon signal. All the information can form a beam-pair interference information which includes for example, the beam ID of its RX beam-forming direction, the beam ID of this neighbor network and the receiving power of the beacon signal, etc.

The measurement result may be reported to the AN at step 830. The measurement result for the blind measurement may include Network ID and Node ID, such as PANI, and NI of the detected AN. If the Network ID and the Node ID are new, they can be reported to the AN. However, when the network ID and node ID were reported before, or similar to those indicated in measurement objects, it is not required to report because it implies that the AN already learns the detected node or network. For the minatory measurement node, the UE can report RSRP together with corresponding beam ID, node ID, and network ID of the neighbor network to the AN.

Besides, before the reporting, it may further determine whether the reporting rules are met. For example, whether maximum RSRP detected in the blind measurement mode is higher than a reporting power threshold, or whether the inference from neighbor network is higher than a predetermined interference level for a certain beam. When the corresponding reporting rules are met, the UE will report the measurement result.

At step 840, the AN may process the received measurement result. For example, when the AN is in in the "Alone" state and receives the measurement result of the blind measurement, the AN may change its state as "Sharing" state and change the measurement type into the monitory measurement mode, or the combination of the blind measurement mode and the monitory measurement mode. In addition, the UE may also add the measurement object to the measurement configuration. If the AN is in the "Sharing" state and receives the measurement result of the blind measurement, the AN may change the measurement object so as to indicate the terminal device to measure the interference from the new discovered network as well. On the other hand, if the measurement result indicates beam-pair interference information, the AN may update beam-pair interference information stored in the AN.

Based on the inter-network interference information, it is possible to further perform the interference coordination based on the beam-pair interference information to set a scheduling constraint for a certain beam.

In addition to the methods for inter-network interference in the wireless network as describing, there are also provided apparatuses for inter-network interference in the wireless network in embodiments of the present disclosure. Hereinafter, the apparatuses as provided herein will be described with reference to FIGS. 9 and 10.

Figure 9:
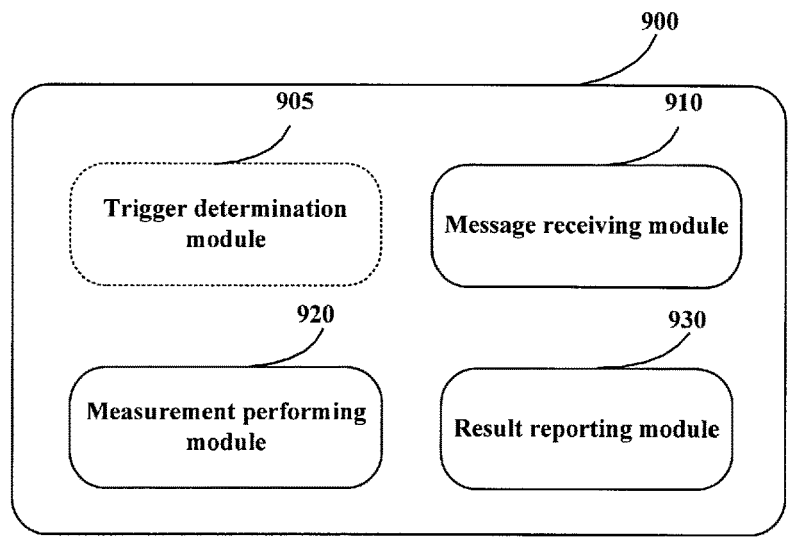
FIG. 9 illustrates a schematic block diagram of an apparatus for inter-network measurement at a terminal device in a wireless network according to an embodiment of the present disclosure.

As illustrated in FIG. 9, the apparatus 900 may comprise a message receiving module 910, a measurement performing module 920 and a result reporting module 930. The message receiving module 910 may be configured to receive an inter-network measurement configuration message containing measurement configurations. The measurement performing module 920 can be configured to perform an inter-network measurement based on the measurement configurations contained in the inter-network measurement configuration message, so as to obtain information on inter-network interference. The result reporting module 930 can be configured to report a measurement result of the inter-network measurement, wherein the measurement result includes the information on inter-network interference.

Particularly, the measurement configurations comprise information on measurement type. The information on measurement type may indicate a blind measurement mode for neighbor network discovery if an access node serving the terminal device is not aware of any neighbor network. Or alternatively, the information on measurement may indicate a monitory measurement mode for specific inter-network interference condition detection if the access node is aware of at least one neighbor network. Additionally or alternatively, the measurement configurations may also comprise information on measurement trigger. The information on measurement trigger may indicate a timing to trigger an inter-network measurement. In such a case, the method may further comprises a trigger determination module 905, which can be configured to determine whether the inter-network measurement is triggered based on the information on measurement trigger. At the same time, the measurement performing module 920 may be further configured to perform the inter-network measurement in response to determining that the inter-network measurement is triggered. Particularly, the information on measurement trigger may comprise 1) a terminal device-specific measurement starting point and a measurement period; 2) information on event trigger indicating a trigger condition to trigger an inter-network measurement; or 3) beacon timing offset of a monitored neighbor network, a measurement starting point and a measurement period which is determined based on mobility speed of the terminal device and adjusted adaptively based on receiving signal behavior.

In an embodiment of the present disclosure, the measurement configurations comprise, alternatively or additionally, information on reporting rules for indicate rules for measurement result reporting. The information on reporting rule may comprise a predetermined interference level threshold for the blind measurement; a predetermined interference level threshold for the monitory measurement, or both. The result reporting module 930 may be further configured to report the measurement result in response to meeting the reporting rules. Alternatively or additionally, the measurement configurations comprise information on measurement object which indicates at least one of a neighbor network and an access node to be monitored. Moreover, if the access node is aware of at least one neighbor network, i.e., in the "Sharing" state, the information on measurement type may further indicate the blind measurement mode for further neighbor network discovery. That is to say, in the "Sharing" state, the measurement indicates both the blind measurement mode and the monitory measurement mode.

In another embodiment of the present disclosure, the measurement performing module 920 may be configured to detect in the blind measurement mode, a beacon signal from a neighbor network in omni-direction or a random beam direction to discover the neighbor network. Alternatively or additionally, the measurement performing module 920 may also be configured to: monitor, in the monitory measurement mode, a beacon signal from a neighbor network to detect signal transmission in a beam direction in which the terminal device receives signals from the access node.

Figure 10:
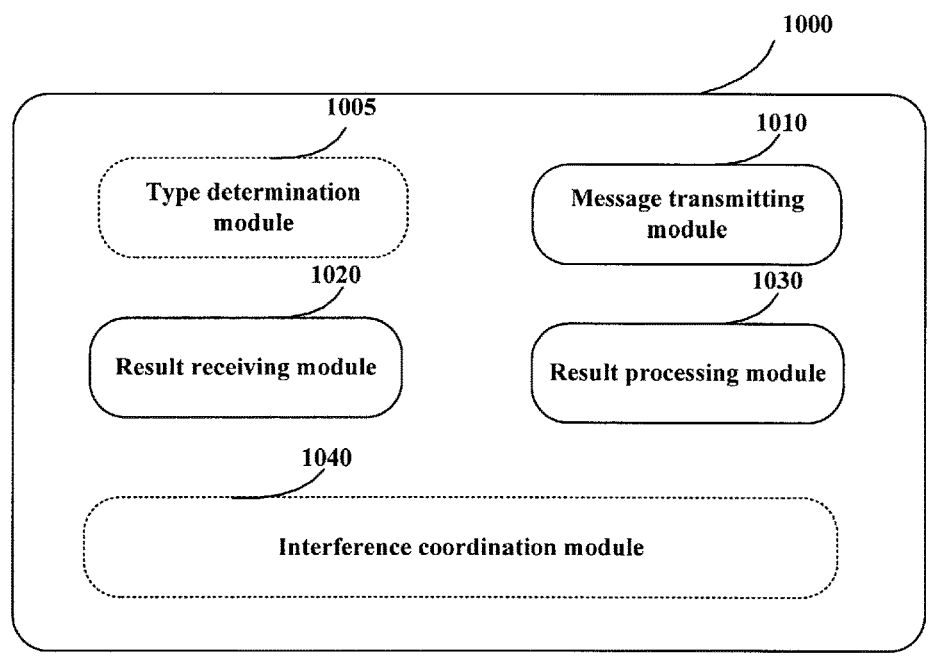
FIG. 10 illustrates a schematic block diagram of an apparatus for inter-network measurement at an access node in a wireless network according to an embodiment of the present disclosure.

FIG. 10 illustrates an apparatus of inter-network measurement at an access node in a wireless network according to an embodiment of the present disclosure. As illustrated in FIG. 10, the apparatus 1000 comprises a message transmitting module 1010, a result receiving module 1020 and a result processing module 1030. The message transmitting module 1010 may be configured to transmit an inter-network measurement configuration message containing measurement configurations to indicate a terminal device to perform an inter-network measurement. The result receiving module 1020 may be configured to receive a measurement result of the inter-network measurement from the terminal device, wherein the measurement result includes information on inter-network interference. The result processing module 1030 may be configured to process the received measurement result.

In addition, the apparatus 1000 may further comprise a type determination module 1005. As described above, the type determination module 1005 may be configured to determine information on measurement type as contained in the measurement configurations based on status of the access node. For example, the information on measurement type may indicate a blind measurement mode for neighbor network discovery if the access node is not aware of any neighbor network, or alternatively indicate a monitory measurement mode for specific inter-network interference condition detection if the access node is aware of at least one neighbor network.

Furthermore, the inter-network measurement configuration message may further comprise information on measurement trigger which indicates a timing to trigger an inter-network measurement; information on reporting rules for measurement result reporting; information on measurement object which indicates at least one of a network and an access node to be monitored or any combination thereof.

In an embodiment of the present disclosure, the result processing module 1030 may be configured to change, in response to the measurement result indicating a new neighbor network being discovered, at least one of information on measurement type and information on measurement object as contained in the measurement configurations. Alternatively or additionally, the result processing module 1030 may be configured to update beam-pair interference information in response to the measurement result indicating beam-pair interference information.

In another embodiment of the present disclosure, the apparatus 1000 may further comprise an interference coordination module 1040. The interference coordination module 1040 may be configured to perform interference coordination based on the beam-pair interference information to set a scheduling constraint for a certain beam.

It can be understood that the above-mentioned modules regarding to FIGS. 9 and 10 can be configured to perform corresponding operations of the methods described with FIGS. 2 to 8 and thus detailed operations of these modules will not be elaborated herein for the conciseness purpose.

Besides, it shall be appreciated that although the above description is made in the context of 5G networks, it should not be construed as limiting the spirit and scope of the present disclosure. The principle and concept of the present disclosure may be more generally applicable to other radio networks involving similar problems. It shall also be appreciated that the above embodiments are described with reference wireless networks belonging to different operator; however, it is only for the illustrative purpose instead of limitation, in fact, the principle and concept of the present disclosure can be applicable to any neighbor wireless networks or access nodes with no regard to belonging different operators or not. Moreover, embodiments of the present disclosure are described with reference to the 5G RAT in high frequency band but the present disclosure is not limited thereto and it is possible to apply the present disclosure in other frequency bands, for example in intermediate frequency band. In addition, in the above-described embodiments of the present disclosure, specific interference scenario, measurement configuration, thresholds, frame structures, inter-network interference information are described but it shall be appreciated that all these contents are illustrated for the illustrative purpose and the skilled in the art could make corresponding modification, addition, deletion or any other forms of changes based on particle requirements.

Figure 11:
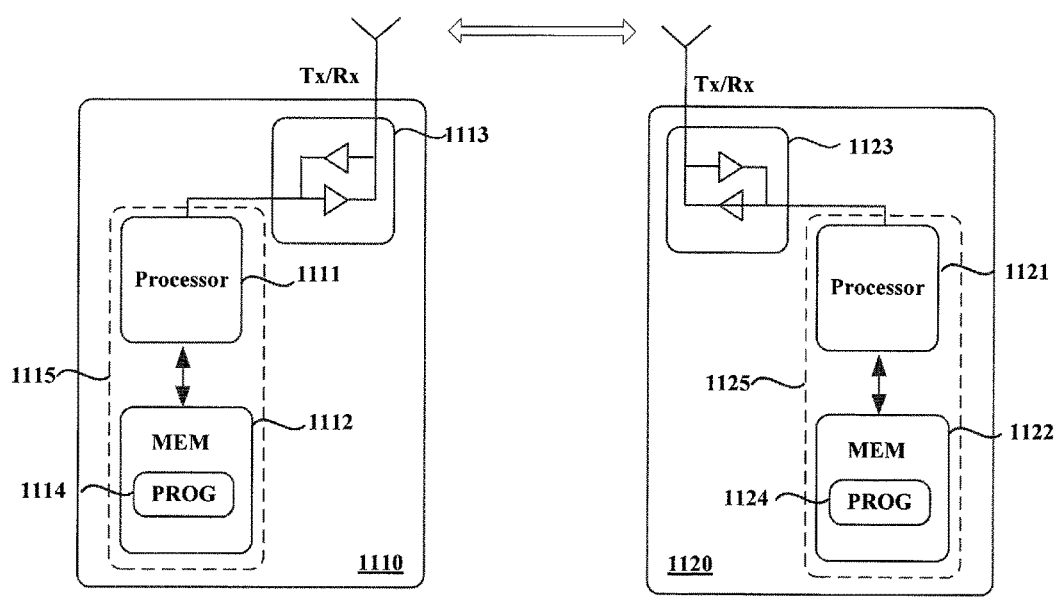
FIG. 11 illustrates a simplified block diagram of an apparatus 1110 that may be embodied as or comprised in a terminal device and an apparatus 1120 that may be embodied as or comprised in an access node as described with reference to FIGS. 2-8.

FIG. 11 further illustrates a simplified block diagram of an apparatus 1110 that may be embodied as or comprised in an access node as described in the present disclosure and an apparatus 1120 that may be embodied as or comprised in a user equipment or terminal device as described in the present disclosure.

The apparatus 1110 comprises at least one processor 1111, such as a data processor (DP) and at least one memory (MEM) 1112 coupled to the processor 1111. The apparatus 1110 may further comprise a transmitter TX and receiver RX 1113 coupled to the processor 1111, which may be operable to communicatively connect to the apparatus 1120. The MEM 1112 stores a program (PROG) 1114. The PROG 1114 may include instructions that, when executed on the associated processor 1111, enable the apparatus 1110 to operate in accordance with the embodiments of the present disclosure, for example to perform the methods 600. A combination of the at least one processor 1111 and the at least one MEM 1112 may form processing means 1115 adapted to implement various embodiments of the present disclosure.

The apparatus 1120 comprises at least one processor 1121, such as a DP, and at least one MEM 1122 coupled to the processor 1121. The apparatus 1120 may further comprise a suitable TX/RX 1123 coupled to the processor 1121, which may be operable for wireless communication with the apparatus 1110. The MEM 1122 stores a PROG 1124. The PROG 1124 may include instructions that, when executed on the associated processor 1121, enable the apparatus 1120 to operate in accordance with the embodiments of the present disclosure, for example to perform the method 200 or 800. A combination of the at least one processor 1121 and the at least one MEM 1122 may form processing means 1125 adapted to implement various embodiments of the present disclosure.

Various embodiments of the present disclosure may be implemented by computer program executable by one or more of the processors 1111, 1121, software, firmware, hardware or in a combination thereof.

The MEMs 1112 and 1122 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 1111 and 1121 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method for inter-network measurement at a terminal device in a wireless network, the method comprising:
   receiving an inter-network measurement configuration message containing measurement configurations, wherein the measurement configurations comprise information on measurement type that indicates:
   a blind measurement mode for neighbor network discovery if an access node serving the terminal device is unaware of any neighbor network, and
   a monitory measurement mode for specific inter-network interference condition detection if the access node is aware of at least one neighbor network;

performing the inter-network measurement based on the measurement configurations contained in the inter-network measurement configuration message, so as to obtain information on inter-network interference, wherein the performing the inter-network measurement comprises:
in the monitory measurement mode:
monitoring a beacon signal from a neighbor network to detect signal transmission in a beam direction in which the terminal device receives signals from the access node, wherein the monitoring the beacon signal comprises detecting a synchronization signal in the beacon signal, and
performing measurements on the beacon signal when the synchronization signal is detected, and
in the blind measurement mode:
detecting a beacon signal from another neighbor network in omni-direction or a random beam direction to discover the other neighbor network, and
obtaining a Network Identity (NI) of the other neighbor network from the detected beacon signal, wherein the NI is a global unique identity of the other neighbor network,
wherein the access node and the other neighbor network belong to two different network operators that operate in overlapping areas; and
reporting a measurement result of the inter-network measurement, wherein the measurement result includes the information on inter-network interference.

2. The method of claim 1, wherein the measurement configurations further comprise information on measurement trigger, which indicates a timing to trigger the inter-network measurement, wherein the method further comprises:
determining whether the inter-network measurement is triggered based on the information on measurement trigger, and
wherein the inter-network measurement is performed in response to determining that the inter-network measurement is triggered.

3. The method of claim 2, wherein the information on measurement trigger comprises one of:
a terminal device-specific measurement starting point and a measurement period;
information on event trigger indicating a trigger condition to trigger the inter-network measurement; and
beacon timing offset of a monitored neighbor network, a measurement starting point, and a measurement period, wherein the measurement period is determined based on mobility speed of the terminal device and adjusted adaptively based on receiving signal behavior.

4. The method of claim 1, wherein the measurement configurations further comprise information on reporting rules for measurement result reporting, wherein the information on reporting rules comprises one or more of:
a predetermined interference level threshold for the blind measurement mode; and
a predetermined interference level threshold for the monitory measurement mode, and
wherein the measurement result is reported in response to meeting the reporting rules.

5. The method of claim 1, wherein the measurement configurations further comprise information on measurement object, which indicates at least one of a neighbor network and an access node to be monitored, and wherein the information on measurement type further indicates the blind measurement mode for further neighbor network discovery if the access node is aware of at least one neighbor network.

6. A terminal device for inter-network measurement in a wireless network, the terminal device comprising a processor and a memory, said memory containing instructions executable by said processor, whereby the terminal device is operative to perform the method of claim 1.

7. An apparatus for inter-network measurement at a terminal device in a wireless network, the apparatus comprising:
a message receiving module configured to receive an inter-network measurement configuration message containing measurement configurations, wherein the measurement configurations comprise information on measurement type that indicates:
a blind measurement mode for neighbor network discovery if an access node serving the terminal device is unaware of any neighbor network, and
a monitory measurement mode for specific inter-network interference condition detection if the access node is aware of at least one neighbor network;
a measurement performing module configured to perform the inter-network measurement based on the measurement configurations contained in the inter-network measurement configuration message, so as to obtain information on inter-network interference, wherein, to perform the inter-network measurement, the measurement performing module is configured to:
in the monitory measurement mode:
monitor a beacon signal from a neighbor network to detect signal transmission in a beam direction in which the terminal device receives signals from the access node, wherein the monitoring of the beacon signal is performed by detecting a synchronization signal in the beacon signal, and
perform measurements on the beacon signal when the synchronization signal is detected, and
in the blind measurement mode:
detect a beacon signal from another neighbor network in omni-direction or a random beam direction to discover the other neighbor network, and
obtain a Network Identity (NI) of the other neighbor network from the detected beacon signal, wherein the NI is a global unique identity of the other neighbor network, and
wherein the access node and the other neighbor network belong to two different network operators that operate in overlapping areas; and
a result reporting module configured to report a measurement result of the inter-network measurement, wherein the measurement result includes the information on inter-network interference.

8. The apparatus of claim 7, wherein the measurement configurations further comprise information on measurement trigger, which indicates a timing to trigger the inter-network measurement, wherein the apparatus further comprises:
a trigger determination module configured to determine whether the inter-network measurement is triggered based on the information on measurement trigger, and
wherein the measurement performing module is configured to perform the inter-network measurement in response to determining that the inter-network measurement is triggered.

9. The apparatus of claim 8, wherein the information on measurement trigger comprises one of:

a terminal device-specific measurement starting point and a measurement period;

information on event trigger indicating a trigger condition to trigger the inter-network measurement; and beacon timing offset of a monitored neighbor network, a measurement starting point, and a measurement period, wherein the measurement period is determined based on mobility speed of the terminal device and adjusted adaptively based on receiving signal behavior.

10. The apparatus of claim 7, wherein the measurement configurations further comprise information on reporting rules for measurement result reporting, wherein the information on reporting rules comprises one or more of:

a predetermined interference level threshold for the blind measurement mode; and a predetermined interference level threshold for the monitory measurement mode, and wherein the result reporting module is configured to report the measurement result in response to meeting the reporting rules.

11. The apparatus of claim 7, wherein the measurement configurations further comprise information on measurement object, which indicates at least one of a neighbor network and an access node to be monitored, and wherein the information on measurement type further indicates the blind measurement mode for further neighbor network discovery if the access node is aware of at least one neighbor network.

\* \* \* \* \*